United States Patent
Maruoka et al.

(10) Patent No.: US 6,880,599 B2
(45) Date of Patent: Apr. 19, 2005

(54) HEAVY DUTY TIRE

(75) Inventors: Kiyoto Maruoka, Kobe (JP); Minoru Nishi, Kobe (JP); Atsushi Yamahira, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 64 days.

(21) Appl. No.: 10/468,040

(22) PCT Filed: Oct. 9, 2002

(86) PCT No.: PCT/JP02/10496

§ 371 (c)(1),
(2), (4) Date: Aug. 14, 2003

(87) PCT Pub. No.: WO03/051651

PCT Pub. Date: Jun. 26, 2003

(65) Prior Publication Data

US 2004/0069392 A1 Apr. 15, 2004

(30) Foreign Application Priority Data

Dec. 14, 2001 (JP) .................................. 2001-382051

(51) Int. Cl.[7] .............................. B60C 3/00; B60C 9/28
(52) U.S. Cl. ...................................... 152/454; 152/538
(58) Field of Search ................................ 152/454, 538

(56) References Cited

U.S. PATENT DOCUMENTS

| 5,131,446 A | * | 7/1992 | Fukumoto et al. ...... 152/538 X |
| 5,647,925 A | | 7/1997 | Sumiya et al. |

FOREIGN PATENT DOCUMENTS

| EP | 318128 A2 | 5/1989 |
| JP | 05-077608 A | 3/1993 |
| JP | 7-164823 A | 6/1995 |
| JP | 08-002210 A | 1/1996 |

* cited by examiner

*Primary Examiner*—Adrienne C. Johnstone
(74) *Attorney, Agent, or Firm*—Birch, Stewart, Kolasch & Birch, LLP

(57) ABSTRACT

When a tread thickness from a second belt ply 7B is defined as T, Tmin is provided in a region Y which is away from a tire equator C by a distance of 0.5 to 0.7 times of a tread grounding half width WT/2. A ratio Tmin/Tc between said minimum value Tmin and the tread thickness Tc at the position of the tire equator C is 0.92 to 0.97, and a ratio Tb/Tc between a tread thickness Tb at a position of an outer end of the second belt ply and Tc is 0.95 to 1.10. When a tread thickness from a carcass 6 is defined as K, Kmin is provided in region Y. A ratio Kmin/Kc is 0.97 to 0.998, and a ratio Kb/Kc is 1.2 to 1.5.

4 Claims, 3 Drawing Sheets

US 6,880,599 B2

HEAVY DUTY TIRE

This application is the national phase under 35 U.S.C. § 371 of PCT International Application No. PCT/JP02/10496 which has an International filing date of Oct. 9, 2002, which designated the United States of America.

FIELD OF THE INVENTION

The present invention relates to a heavy duty tire which uniforms wear by specifying a tread thickness from a second belt ply and carcass.

BACKGROUND ART

In the case of a heavy duty tire for example, its tread outline shape a is formed into a single arc shape in a vulcanizing metal mold as schematically shown in FIG. 3.

In such a tire, however, in a standard internal pressure state in which the tire is assembled into a rim and a standard internal pressure is charged into the tire, there is a tendency that a tread surface swells radially outward in a region Y which is separated from a tire equator by a distance of 0.5 to 0.7 times of a tread half width. For this reason, a difference in circumferential lengths between a swelling portion b and a tread grounding end e is increased, slip between the tread surface on the side of the tread grounding end and a road surface is generated, and uneven wear such as so-called shoulder wear is prone to be generated.

In order to restrain the shoulder wear, Japanese Patent Application Laid-open No. H7-164823 and the like disclose a technique in which the outline of the tread in the vulcanizing metal mold is formed into a double radius shape in which a portion of the tread on the side of the tread grounding end is an arc having a greater radius of curvature than a portion of the tread on the side of the tire equator, thereby bringing the outline of the tread in the standard internal pressure state closer to the single arc to restrain the shoulder wear.

Such a technique can restrain the shoulder wear in some degree but there is a problem that new shoulder wear is produced in the region Y. Especially when a circumferential groove is formed in the region Y, there is a tendency that so-called railway wears in which the groove side edge of the circumferential groove wears are seriously generated.

It is conventionally known that there is a correlation between a grounding surface shape and an uneven wear of a tire, and a slip is generated in a portion of the tire in which the grounding length is shortened and wear proceeds fast. Thereupon, the present inventor researched that the grounding surface shape was improved to suppress the uneven wear such as shoulder wear and railway wear, thereby equalizing the wear.

As a result, the inventor found that the grounding surface shape has a correlation between a tread thickness from a second belt ply to a tread surface in a belt layer and a tread thickness from a carcass to the tread surface, and if each of the tread thickness is limited, the grounding surface shape could be optimized.

That is, it is an object of the invention to provide a heavy duty tire capable of improving the grounding surface shape and equalizing the wear based on an idea that the tread thickness from the second belt ply and the tread thickness from the carcass are limited.

DISCLOSURE OF THE INVENTION

An invention described in claim 1 of this application provides a heavy duty tire comprising a carcass extending from a tread portion to a bead core of a bead portion through a sidewall portion, and a belt layer having a first belt ply arranged inside the tread portion and outside the carcass and a second belt ply outside the first belt ply, wherein the second belt ply is curved in a form of projection of a single arc having a radius of curvature Rb of 450 to 700 mm, when a tread thickness between an outline of a tread surface and the second belt ply is defined as T, a tread thickness minimum position Qt in which the tread thickness becomes a minimum value Tmin is provided in a region Y which is away from a tire equator C by a distance of 0.5 to 0.7 times of a tread grounding half width, a ratio Tmin/Tc between the minimum value Tmin and a tread thickness Tc at the position of the tire equator C is 0.92 to 0.97, and a ratio Tb/Tc between a tread thickness Tb at a position of an outer end of the second belt ply and the tread thickness Tc is 0.95 to 1.10, when a tread thickness between the outline of the tread surface and the carcass is defined as K, a tread thickness minimum position Qk in which the tread thickness K becomes a minimum value Kmin is provided in the region Y, a ratio Kmin/Kc between the minimum value Kmin and a tread thickness Kc at a position of the tire equator C is 0.97 to 0.998, and a ratio Kb/Kc between the tread thickness Kb at a position of the outer end of the second belt ply and the tread thickness Kc is 1.2 to 1.5.

In this specification, the term "tread grounding half width" means a distance between a tire equator C and a tire axially outer end (tread grounding end E) of a tread grounding surface which grounds when a standard load is applied to the tire in its standard internal pressure state in which the tire is assembled into a rim and a standard internal pressure is charged into the tire.

The term "standard rim" is a rim whose specification are determined for each tire in the specification system including the specification based on the tire. For example, in the case of JATMA, a size of rim having a rim width narrower than a standard rim is "rim having a width which is one rank narrower than the standard rim", and a size of a rim whose width narrower than the standard rim is not set means "standard rim", in the case of TRA, a size of rim having a rim width narrower than "Design Rim" is "rim having a width which is one rank narrower than "Design Rim", and a size of a rim whose width narrower than the standard rim is not set means "Design Rim", and In the case of ETRTO, a size of rim having a rim width narrower than "Measuring Rim" is "rim having a width which is one rank narrower than "Measuring Rim", and a size of a rim whose width narrower than the standard rim is not set means "Measuring Rim"

Further, the term "standard internal pressure" is an air pressure whose specifications are determined for each tire, and the standard internal pressure is a maximum air pressure in the case of JATMA, the standard internal pressure is a maximum value described in "TIRE LOAD LIMITS AT VARIOUS COLD INFLATION PRESSURE" in the case of TRA, and the standard internal pressure is an "INFLATION PRESSURE" in the case of ETRTO. If the tire is for a passenger car, the standard internal pressure is 180 kPa. Further, the "standard internal pressure" is air pressure determined by the specifications for each tire, and the standard internal pressure is maximum load ability in the case of the JATMA, and the standard internal pressure is a maximum value described in a table "TIRE LOAD LIMITS AT VARIOUS COLD INFLATION PRESSURES" in the case of the TRA, and the and the standard internal pressure is "LOAD CAPACITY" in the case of the ETRTO.

BEST MODE FOR CARRYING OUT THE INVENTION

An embodiment of the present invention will be explained based on the illustrated example.

Figure 1:
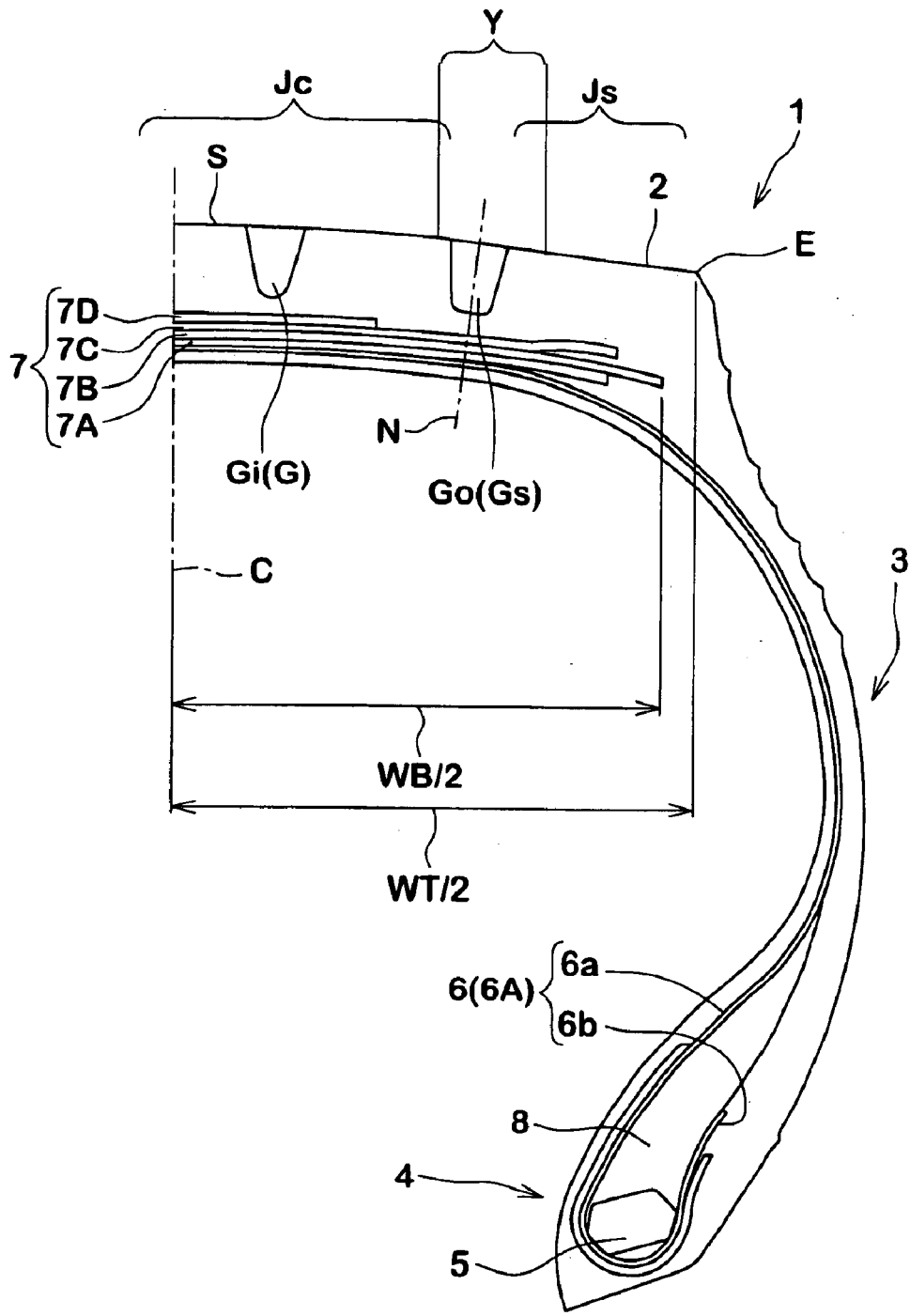
FIG. 1 is a sectional view of a tire according to an embodiment of the present invention.
Figure 2:
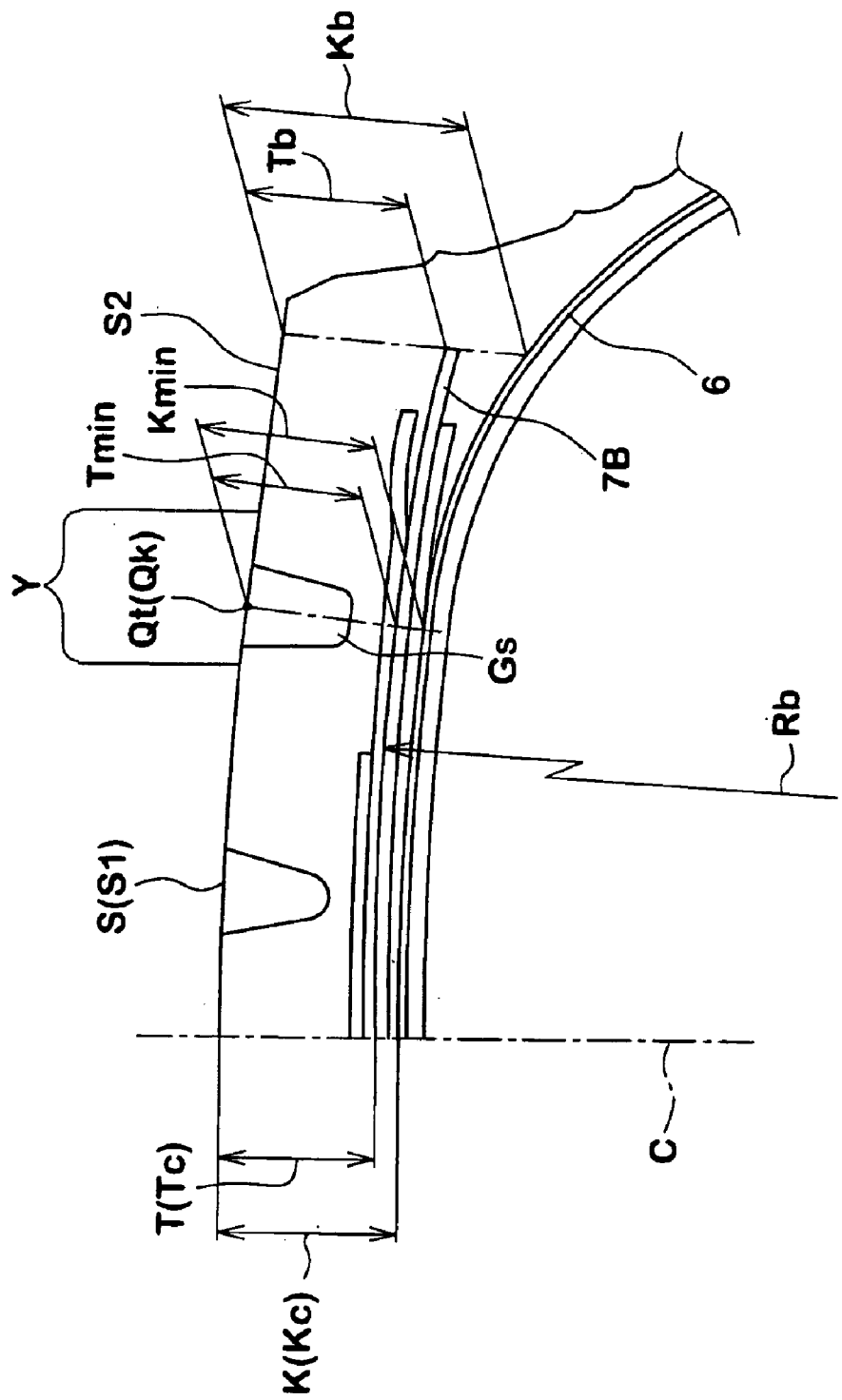
FIG. 2 is an enlarged sectional view of a tread portion.
Figure 3:
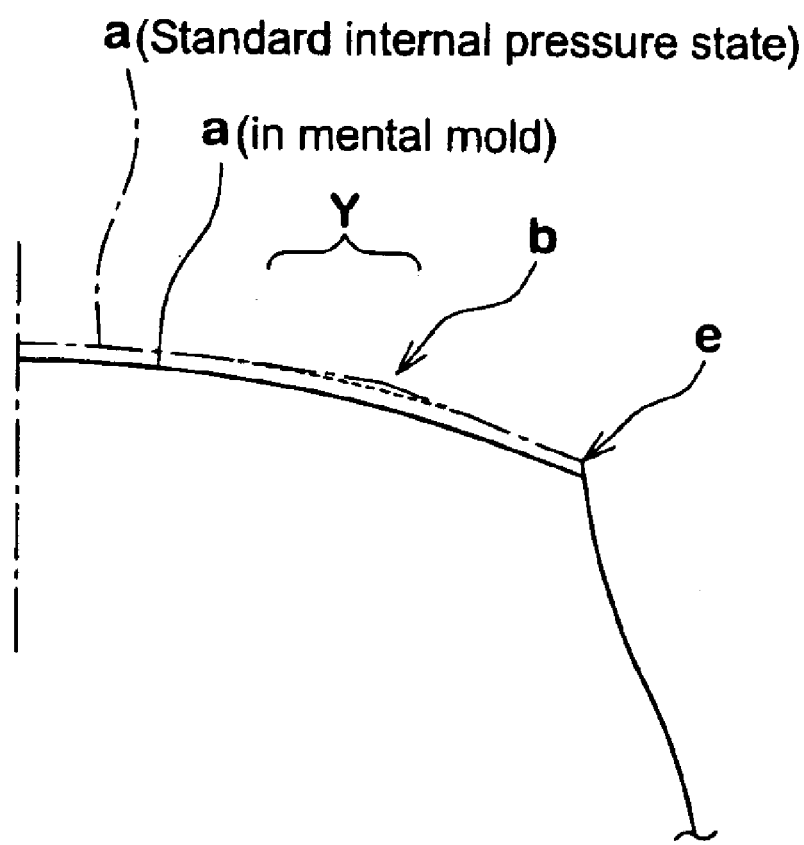
FIG. 3 is a diagram showing a tread outline shape in a conventional tire.

FIG. 1 is a sectional view of a heavy duty tire for a truck, a bus or the like according to the present invention, and FIG. 2 is an enlarged view of a tread portion of the tire.

In FIG. 1, a pneumatic tire 1 includes a carcass 6 extending from a tread portion 2 to a bead core 5 of a bead portion 4 through a sidewall portion 3, and a belt layer 7 disposed inside the tread portion 2 and outside the carcass 6.

The carcass 6 is formed of one or more (one, in this example) of carcass ply 6A in which carcass cords are arranged at an angle of 70 to 90° with respect to a circumferential direction of the tire. Metal cords such as steel are preferable as the carcass cords.

The carcass ply 6A includes ply bodies 6a and 6a extending between the bead cores 5 and 5, and folded-back portions 6b and 6b folded back and retained around the bead cores 5 and 5. A bead apex rubber 8 extending in a taper manner from the bead core 5 radially outward is disposed between the ply main body 6a and the folded-back portion 6b. The bead apex rubber 8 reinforces a portion of the tire from the bead portion 4 to the sidewall portion 3.

The belt layer 7 is formed of three or more belt plies using metal cords as the belt cords. In this example, steel cords have four plies, i.e., a first belt ply 7A which is arranged at an angle of 60±15° with respect to the circumferential direction of the tire and disposed at innermost portion in the radial direction, and the second to the fourth belt plies 7B, 7C and 7D arranged at small angle of 10 to 35° with respect to the circumferential direction of the tire.

In this belt layer 7, the ply width in the tire axial direction of the first belt ply 7A is smaller than the ply width of the second belt ply 7B and is substantially equal to the ply width of the third belt ply 7C, the ply width WB of the second belt ply 7B which has the maximum width is set to 0.80 to 0.95 times of the tread grounding width WT, thereby reinforcing substantially the entire width of the tread portion 2 with hooping effect, and enhancing the tread rigidity. The fourth belt ply 7D having the narrowest width functions as a breaker which protects the first to third belt plies 7A to 7C and carcass 6 from being injured outside.

Then, on the tread portion 2, the tire 1 is provided with a tread pattern having two or more circumferential main grooves G which continuously extend in the circumferential direction. The circumferential main groove G has a width of 3 mm or more, and extends in the circumferential direction in a straight or zigzag form.

In this example, the circumferential main groove G comprises four grooves, i.e., inner circumferential main grooves Gi on opposite sides of the tire equator C, and outer circumferential main grooves Go on the outer sides. The outer circumferential main grooves Go constitute the outermost shoulder groove Gs in the tire axial direction.

The groove center line N of the shoulder groove Gs passes through a region Y which is away from the tire equator C by a distance of 0.5 to 0.7 times of the tread grounding width WT/2. With this structure, the tread portion 2 is divided into a tread center portion Jc at inner side of the shoulder groove Gs and a tread shoulder portion Js at outer side of the shoulder groove Gs. When the shoulder groove Gs is a zigzag groove, a center of the zigzag amplitude is defined as the groove center line N.

In this embodiment, in order to equalize the wear in the tire 1, a tread thickness T between an outline S (tread outline S, hereinafter) of the tread surface and the second belt ply 7B, and a tread thickness K from the tread outline S and the carcass 6 are specified as follows:

More specifically, as shown in FIG. 2, (1) in the tread thickness T, a tread thickness minimum position Qt in which the tread thickness T becomes a minimum value Tmin is provided in the region Y, a ratio Tmin/Tc between the minimum value Tmin and a tread thickness Tc at a position of the tire equator C is set to 0.92 to 0.97, a ratio Tb/Tc between the tread thickness Tb and the tread thickness Tc at a position on an outer end of the second belt ply 7B is set to 0.95 to 1.10, (2) in the tread thickness K, a tread thickness minimum position Qk in which the tread thickness K becomes a minimum value Kmin is provided in the region Y, a ratio Kmin/Kc between the minimum value Kmin and a tread thickness Kc at a position of the tire equator C is set to 0.97 to 0.998, a ratio Kb/Kc between the tread thickness Kb and the tread thickness Kc at a position of an outer end of the second belt ply 7B is set to 1.2 to 1.5.

At that time, the tread thicknesses T and K are increased from the tread thickness minimum positions Qt and Qk to the position of the tire equator C and the position of the second belt ply. The positions of the tread thickness minimum positions Qt and Qk may be different but in generally the positions are the same.

Here, there is a correlation between the tread thicknesses T, K and the grounding surface shape, and by limiting the tread thicknesses T and K as described above, it is possible to restrain the swelling tendency in the region Y in the grounding shape, to restrain the shortage of the grounding length at the tread grounding end E, to improve the grounding surface shape, and to equalize the wear.

If the ratio Tmin/Tc in the tread thickness T is greater than 0.97, the effect for restraining the swelling tendency in the region Y is eliminated, and adversely if the ratio Tmin/Tc is smaller than 0.92, the grounding length in the region Y becomes excessively small, and railway wear is generated in the shoulder groove Gs.

If the ratio Tb/Tc in the tread thickness T is smaller than 0.95, the grounding length at the tread grounding end E becomes excessively small, the shoulder wear is generated. If the ratio Tb/Tc exceeds 1.10, adversely, the grounding length at the tread grounding end E becomes excessively great, the wear in the tread center portion Jc is increased, and there is a tendency that a so-called center wear is generated.

In the tread thickness K as well, if the ratio Kmin/Kc is greater than 0.998, the effect for restraining the swelling which is prone to be generated in the region Y is eliminated, and adversely if the ratio Kmin/Kc is smaller than 0.97, the grounding length in the region Y is excessively small, and railway wear is generated in the shoulder groove Gs. If the ratio Kb/Kc is smaller than 1.2, the grounding length at the tread grounding end E becomes excessively small, the shoulder wear is generated. If the ratio Kb/Kc is greater than 1.50, the grounding length at the tread grounding end E becomes excessively great, the wear at the tread center portion Jc is increased, and there is a tendency that a so-called center wear is generated.

When the second belt ply 7B is of a single projecting arc having a radius of curvature Rb of 450 to 700 mm, the grounding surface shape is improved by the tread thicknesses T and K. When the radius of curvature Rb of the second belt ply 7B is out from the above range, and when the second belt ply 7B is formed with a curved line other than the single arc, the correlation between the grounding surface shape and the tread thicknesses T, K becomes weak, the wear is not equalized sufficiently. In order to obtain the distribution of the tread thicknesses T, K, in this embodiment, the tread outline S in the tread center portion Jc is formed of a projecting arc outline S1 using a single arc or a plurality of arcs, and the tread outline S in the tread shoulder portion Js is formed of a substantially straight outline S2.

Although the preferred embodiment of the present invention has been described in detail above, the invention is not limited to the illustrated embodiment, and the invention can variously be modified and carried out.

[Embodiment]

Heavy duty tires having a structure shown in FIG. 1 and a size of 295/80R22.5 were prototyped based on specifications shown in Table 1, and uneven wear performance of the prototyped tires were tested, and the results are shown in Table 1.

The grounding length shown in Table 1 is a length in the circumferential direction measured in the grounding surface shape when a standard load was applied to the tire in the standard internal pressure state in which the tire was assembled into the standard rim and a standard internal pressure was charged into the tire. A grounding length at the tire equator is L1, a grounding length of the side edge of the groove on the side of the tire equator C of the shoulder groove Gs (in this example, a distance of 60 mm from the tire equator) is L2, a grounding length of the side line of the groove on the side of the grounding end of the shoulder groove Gs (in this example, a distance of 76 mm from the tire equator) is L3, and a grounding length at the grounding end E is L4. If a variation in the grounding length is smaller, the uniformity of wear is higher and more excellent.

(1) Wear Property

The prototyped tires were mounted rims (22.5×8.25; having a rim width narrower than a standard rim by one rank) of all wheels of a truck (2-2•D type) under an internal pressure (900 kPa), and the vehicle was allowed to run through a distance of 100,000 km, and wear amounts at various positions were measured after running. A wear amount at the tire equator is defined as Z1, a wear amount at the side line of the groove on the side of tire equator C of the shoulder groove Gs (in this example, a distance of 60 mm from the tire equator) is defined as Z2, a wear amount at the side line of groove on the side of the grounding end of the shoulder groove Gs (in this example, a distance of 76 mm from the tire equator) is defined as Z3, and a wear amount at the grounding end E is defined as Z4. The results are evaluated based on an index in which a comparative example 1 is 100. As the value is smaller, the wear amount is smaller.

TABLE 1

|  | Embodiment 1 | Embodiment 2 | Embodiment 3 | Embodiment 4 | Comparative example 1 | Comparative example 2 |
| --- | --- | --- | --- | --- | --- | --- |
| Tread grounding width WT <mm> | 240 | 240 | 240 | 240 | 228 | 240 |
| Belt ply width WB <mm> | 220 | 220 | 220 | 220 | 204 | 220 |
| Radius Rb of belt ply <mm> | 580 | 580 | 580 | 580 | 580 | 580 |
| Groove width of shoulder groove (*1) <mm> | 13 | 13 | 13 | 13 | 13 | 13 |
| Tread thickness T <mm> | | | | | | |
| Tmin (*2) | 22.6 | 23.3 | 22.6 | 22.6 | 24.0 | 21.8 |
| Tc | 24 | 24 | 24 | 24 | 24 | 24 |
| Tb | 24.2 | 24.2 | 24.2 | 25.7 | 24.0 | 25.0 |
| (Ratio Tmin/Tc) | 0.94 | 0.97 | 0.94 | 0.94 | 1 | 0.91 |
| (Ratio Tb/Tc) | 1.01 | 1.01 | 1.01 | 1.07 | 1 | 1.04 |
| Tread thickness K <mm> | | | | | | |
| Kmin (*2) | 27.5 | 27.7 | 27.1 | 27.5 | 28.1 | 26.4 |
| Kc | 27.8 | 27.8 | 27.8 | 27.8 | 27.8 | 27.8 |
| Kb | 37.0 | 37.0 | 37.0 | 41.0 | 33.1 | 37.0 |
| (Ratio Kmin/Kc) | 0.99 | 0.995 | 0.975 | 0.99 | 1.01 | 0.95 |
| (Ratio Kb/Kc) | 1.33 | 1.33 | 1.33 | 1.48 | 1.19 | 1.33 |
| Ratio of grounding length | | | | | | |
| L2/L1 | 0.95 | 0.97 | 0.95 | 0.95 | 0.94 | 0.92 |
| L3/L1 | 0.94 | 0.96 | 0.93 | 0.93 | 0.93 | 0.91 |
| L4/L1 | 0.92 | 0.92 | 0.91 | 0.95 | 0.89 | 0.92 |
| Wear property | | | | | | |
| Wear amount Z1 | 100 | 100 | 100 | 100 | 100 | 100 |
| Wear amount Z2 | 97 | 95 | 100 | 100 | 100 | 105 |
| Wear amount Z3 | 95 | 92 | 99 | 92 | 100 | 110 |
| Wear amount Z4 | 85 | 85 | 88 | 80 | 100 | 95 |

*1: A distance from the tire equator of the groove center line of the shoulder groove is 68 mm (corresponding to 0.57 times of grounding half width WT/2)
*2: A distance from the tire equator of the minimum positions Qt and Qk is 72 mm (corresponding to 0.60 times of grounding half width WT/2)

As shown in Table, it could be confirmed that in the tire of the embodiment, the uneven wear was improved.

INDUSTRIAL APPLICABILITY

As described above, according to a tire of the present invention, it is possible to improve the grounding surface shape by limiting the tread thickness from the second belt ply and the tread thickness from the carcass, and it is possible to enhance the uneven wear resistance performance and to equalize the wear.

What is claimed is:

1. A heavy duty tire comprising a carcass extending from a tread portion to a bead core of a bead portion through a sidewall portion, and a belt layer having a first belt ply arranged inside the tread portion and outside the carcass and a second belt ply outside the first belt ply, wherein said second belt ply is curved in a form of projection of a single arc having a radius of curvature Rb of 450 to 700 mm, when a tread thickness between an outline of a tread surface and said second belt ply is defined as T, a tread thickness minimum position Qt in which said tread thickness becomes a minimum value Tmin is provided in a region Y which is away from a tire equator C by a distance of 0.5 to 0.7 times of a tread grounding half width, a ratio Tmin/Tc between the minimum value Tmin and a tread thickness Tc at the position of said tire equator C is 0.92 to 0.97, and a ratio Tb/Tc between a tread thickness Tb at a position of an outer end of said second belt ply and said tread thickness Tc is 0.95 to 1.10, when a tread thickness between said outline of the tread surface and said carcass is defined as K, a tread thickness minimum position Qk in which said tread thickness K becomes a minimum value Kmin is provided in said region Y, a ratio Kmin/Kc between the minimum value Kmin and a tread thickness Kc at a position of said tire equator C is 0.97 to 0.998, and a ratio Kb/Kc between the tread thickness Kb at a position of the outer end of said second belt ply and said tread thickness Kc is 1.2 to 1.5.

2. The heavy duty tire according to claim 1, wherein said tread thicknesses T and K are increased from tread thickness minimum positions Qt, Qk to a position of said tire equator C and a position of the outer end of said second belt ply.

3. The heavy duty tire according to claim 1 or 2, said tread portion includes two or more circumferential main grooves which continuously extend in the circumferential direction, a groove center line of a shoulder groove disposed on the outermost side in the tire axial direction of the circumferential main grooves passes through said region Y.

4. The heavy duty tire according to claim 1, wherein a belt cord of said belt layer and a carcass cord of said carcass are metal cords.

\* \* \* \* \*